(12) United States Patent
Miskowic

(10) Patent No.: US 9,657,866 B1
(45) Date of Patent: May 23, 2017

(54) WATER VALVE ROTATIONAL BRAKE

(71) Applicant: Randall D. Miskowic, Las Vegas, NV (US)

(72) Inventor: Randall D. Miskowic, Las Vegas, NV (US)

( * ) Notice: Subject to any disclaimer, the term of this patent is extended or adjusted under 35 U.S.C. 154(b) by 72 days.

(21) Appl. No.: 14/849,392

(22) Filed: Sep. 9, 2015

(51) Int. Cl.
*F16K 35/06* (2006.01)
*F16K 35/04* (2006.01)
*F16K 31/60* (2006.01)

(52) U.S. Cl.
CPC ............... *F16K 35/04* (2013.01); *F16K 31/60* (2013.01); *F16K 35/06* (2013.01)

(58) Field of Classification Search
CPC .......... F16K 35/04; F16K 31/60; F16K 35/06; F16K 31/605
USPC ....... 251/90, 284, 286, 288, 95, 98; 137/385
See application file for complete search history.

(56) References Cited

U.S. PATENT DOCUMENTS

| | | | |
|---|---|---|---|
| 1,823,891 A * | 9/1931 | Frankfort | F16K 35/10 251/90 |
| 3,559,684 A | 2/1971 | Rudewick, III | |
| 4,220,175 A | 9/1980 | Keller, III et al. | |
| 5,950,982 A * | 9/1999 | Williams | F16K 35/10 251/285 |
| 6,283,447 B1 | 9/2001 | Fleet | |

* cited by examiner

*Primary Examiner* — Craig Schneider
*Assistant Examiner* — Andrew J Rost
(74) *Attorney, Agent, or Firm* — Stevenson IP, LLC

(57) ABSTRACT

A water valve rotational brake including a convex, C-shaped base, a plurality of suction cups continuously disposed on a bottom surface of the base from a right edge of the base to a left edge of the base, a pair of pin height adjustable legs disposed on a top surface of the base, and an angled locking arm attached to a top end of each of the pair of pin height adjustable legs. A curvature of a front edge of the base substantially conforms to a curvature of an exterior edge of a water valve. The plurality of suction cups removably attaches to a surface proximal the water valve.

4 Claims, 3 Drawing Sheets

WATER VALVE ROTATIONAL BRAKE

BACKGROUND OF THE INVENTION

Various types of water control devices are known in the prior art. However, what has been needed is a water valve rotational brake including a convex, C-shaped base, a plurality of suction cups continuously disposed on a bottom surface of the base from a right edge of the base to a left edge of the base, a pair of pin height adjustable legs disposed on a top surface of the base, and an angled locking arm attached to a top end of each of the pair of pin height adjustable legs. What has been further needed is for a curvature of a front edge of the base to substantially conform to a curvature of an exterior edge of a water valve. Lastly, what has been needed is for the plurality of suction cups to removably attach to a surface proximal the water valve in order to simultaneously dispose the front edge of the base adjacent to the exterior edge of the water valve and the locking arm above a rotatable handle on the water valve. In this position, the locking arm is configured to prevent the handle from rotating in a right direction and, alternately, a left direction beyond the locking arm disposed atop the water valve.

The water valve rotational brake is a safety mechanism for both adults and children that easily and effectively prevents a handle on a water valve from passing a certain rotational point for both the passage of cold water and the passage of hot water. Furthermore, the pair of pin height adjustable legs ensures that the locking arm will fit atop water valves of varying sizes.

FIELD OF THE INVENTION

The present invention relates to water control devices, and more particularly, to a water valve rotational brake.

SUMMARY OF THE INVENTION

The general purpose of the present water valve rotational brake, described subsequently in greater detail, is to provide a water valve rotational brake which has many novel features that result in a water valve rotational brake which is not anticipated, rendered obvious, suggested, or even implied by prior art, either alone or in combination thereof.

To accomplish this, the present water valve rotational brake includes a convex C-shaped base, a plurality of suction cups, a pair of pin height adjustable legs, and an angled locking arm. The base has a top surface, a bottom surface, a right edge, a left edge, a front edge, and a back edge. The plurality of suction cups is continuously disposed on the bottom surface of the base from the right edge of the base to the left edge of the base. The plurality of suction cups can optionally be seven suction cups. The pair of pin height adjustable legs includes a right pin height adjustable leg and a left pin height adjustable leg. Each of the right pin height adjustable leg and the left pin height adjustable leg has a top end and a bottom end. The bottom end of each of the right pin height adjustable leg and the left pin height adjustable leg is attached to the top surface of the base proximal the right edge of the base and the left edge of the base, respectively.

The angled locking arm has a medially disposed apex, a right end, a left end, a top area, and a bottom area. The bottom area of the locking arm proximal the right end of the locking arm and the bottom area of the locking arm proximal the left end of the locking arm is attached to the top end of the right pin height adjustable leg and the left pin height adjustable leg, respectively. The apex of the locking arm is forwardly disposed at an obtuse angle between the right edge of the base and the left edge of the base.

A curvature of the front edge of the base substantially conforms to a curvature of an exterior edge of a water valve. The plurality of suction cups is configured to removably attach to a surface proximal the water valve in order to simultaneously dispose the front edge of the base adjacent to the exterior edge of the water valve and the locking arm above a rotatable handle on the water valve. The locking arm is configured to prevent the handle from rotating in a right direction and, alternately, in a left direction, beyond the locking arm disposed atop the water valve. The base, the pair of pin height adjustable legs, and the locking arm are optionally metal.

Thus has been broadly outlined the more important features of the present water valve rotational brake so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

With reference now to the drawings, and in particular FIGS. 1 through 5 thereof, an example of the instant water valve rotational brake employing the principles and concepts of the present water valve rotational brake and generally designated by the reference number 10 will be described.

Figure 1:
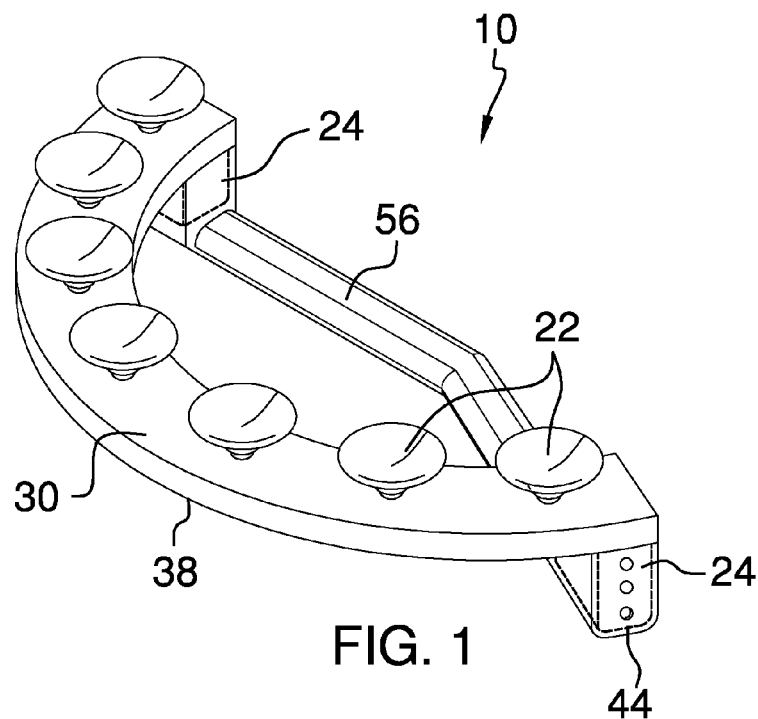
FIG. 1 is a bottom isometric view.
Figure 2:
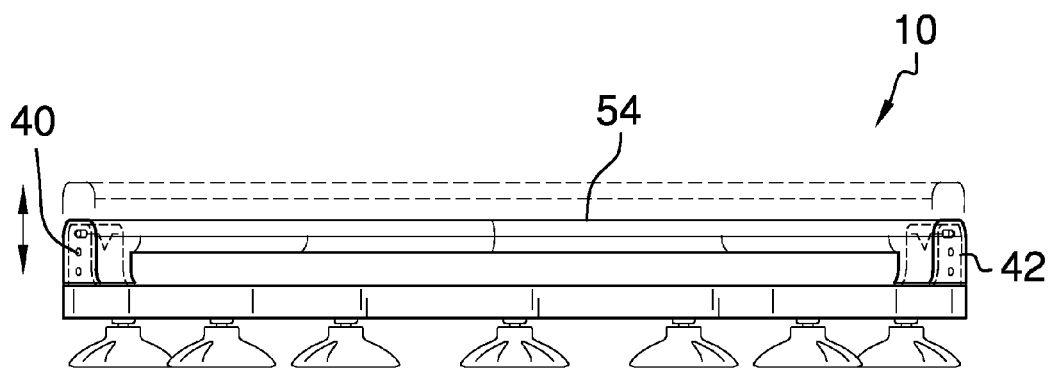
FIG. 2 is a front elevation view.
Figure 3:
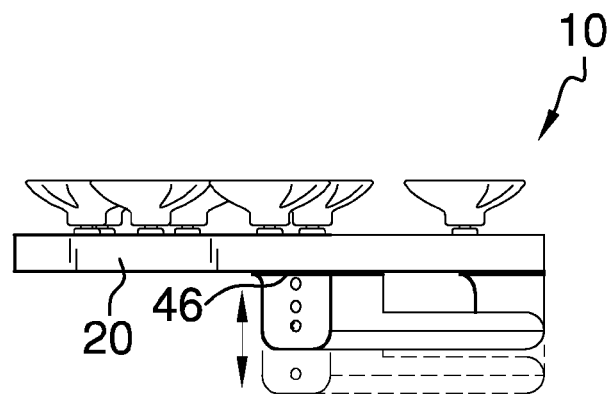
FIG. 3 is a top plan view.

Referring to FIGS. 1 through 5 the present water valve rotational brake 10 is illustrated. The water valve rotational brake 10 includes a convex C-shaped base 20, a plurality of suction cups 22, a pair of pin height adjustable legs 24, and an angled locking arm 26. The base 20 has a top surface 28, a bottom surface 30, a right edge 32, a left edge 34, a front edge 36, and a back edge 38. The plurality of suction cups 22 is continuously disposed on the bottom surface 30 of the base 20 from the right edge 32 of the base 20 to the left edge 34 of the base 20. As best shown in FIG. 2, the pair of pin height adjustable legs 24 includes a right pin height adjustable leg 40 and a left pin height adjustable leg 42. Each of the right pin height adjustable leg 40 and the left pin height adjustable leg 42 has a top end 44 and a bottom end 46. The bottom end 46 of each of the right pin height adjustable leg 40 and the left pin height adjustable leg 42 is attached to the top surface 28 of the base 20 proximal the right edge 32 of the base 20 and the left edge 34 of the base 20, respectively.

Figure 4:
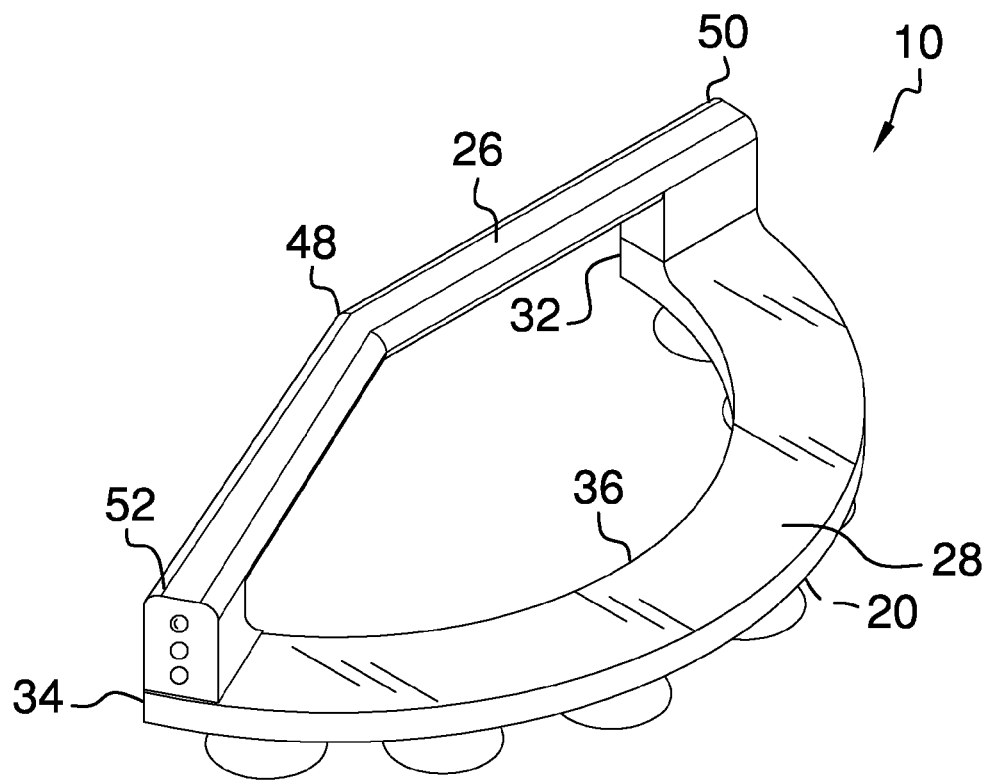
FIG. 4 is a front isometric view.
Figure 5:
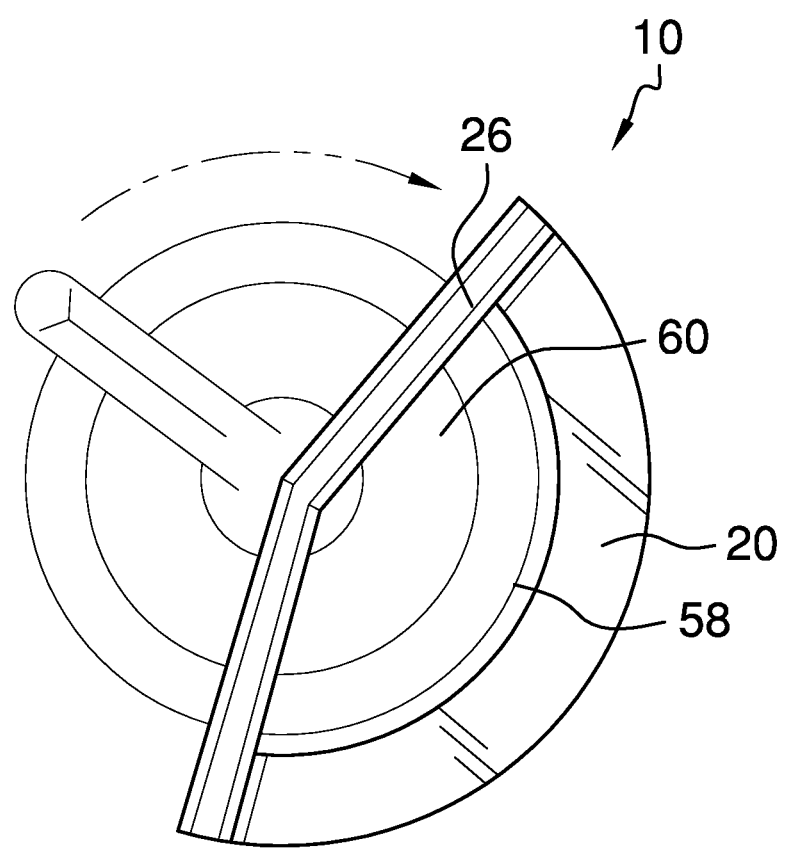
FIG. 5 is an in-use view.

The angled locking arm 26 has a medially disposed apex 48, a right end 50, a left end 52, a top area 54, and a bottom area 56. The bottom area 56 of the locking arm 26 proximal the right end 50 of the locking arm 26 and the bottom area 56 of the locking arm 26 proximal the left end 52 of the locking arm 26 is attached to the top end 44 of the right pin height adjustable leg 40 and the left pin height adjustable leg 42, respectively. As best shown in FIG. 4, the apex 48 of the locking arm 26 is forwardly disposed at an obtuse angle between the right edge 32 of the base 20 and the left edge 34 of the base 20. As best shown in FIG. 5, a curvature of the front edge 36 of the base 20 substantially conforms to a curvature of an exterior edge 58 of a water valve 60.

What is claimed is:

1. A water valve rotational brake comprising:
    a convex C-shaped base having a top surface, a bottom surface, a right edge, a left edge, a front edge, and a back edge;
    a plurality of suction cups continuously disposed on the base bottom surface from the base right edge to the base left edge;
    a pair of pin height adjustable legs comprising a right pin height adjustable leg and a left pin height adjustable leg, each of the right pin height adjustable leg and the left pin height adjustable leg having a top end and a bottom end, wherein the bottom end of each of the right pin height adjustable leg and the left pin height adjustable leg is attached to the base top surface proximal the base right edge and the base left edge, respectively; and
    an angled locking arm having a medially disposed apex, a right end, a left end, a top area, and a bottom area, wherein the locking arm bottom area proximal the locking arm right end and the locking arm bottom area proximal the locking arm left end is attached to the top end of the right pin height adjustable leg and the left pin height adjustable leg, respectively;
    wherein the locking arm apex is forwardly disposed at an obtuse angle from the base right edge and the base left edge;
    wherein a curvature of the base front edge substantially conforms to a curvature of an exterior edge of a water valve;
    wherein the plurality of suction cups is configured to removably attach to a surface proximal the water valve in order to simultaneously dispose the base front edge adjacent to the exterior edge of the water valve and the locking arm above a rotatable handle on the water valve;
    wherein the locking arm is configured to prevent the handle from rotating in a right direction and alternately in a left direction beyond the locking arm disposed atop the water valve.

2. The water valve rotational brake of claim 1 wherein the plurality of suction cups is seven suction cups.

3. The water valve rotational brake of claim 1 wherein the base, the pair of pin height adjustable legs, and the locking arm are metal.

4. A water valve rotational brake comprising:
    a convex C-shaped base having a top surface, a bottom surface, a right edge, a left edge, a front edge, and a back edge;
    a plurality of suction cups continuously disposed on the base bottom surface from the base right edge to the base left edge;
    wherein the plurality of suction cups is seven suction cups;
    a pair of pin height adjustable legs comprising a right pin height adjustable leg and a left pin height adjustable leg, each of the right pin height adjustable leg and the left pin height adjustable leg having a top end and a bottom end, wherein the bottom end of each of the right pin height adjustable leg and the left pin height adjustable leg is attached to the base top surface proximal the base right edge and the base left edge, respectively; and
    an angled locking arm having a medially disposed apex, a right end, a left end, a top area, and a bottom area, wherein the locking arm bottom area proximal the locking arm right end and the locking arm bottom area proximal the locking arm left end is attached to the top end of the right pin height adjustable leg and the left pin height adjustable leg, respectively;
    wherein the locking arm apex is forwardly disposed at an obtuse angle from the base right edge and the base left edge;
    wherein a curvature of the base front edge substantially conforms to a curvature of an exterior edge of a water valve;
    wherein the plurality of suction cups is configured to removably attach to a surface proximal the water valve in order to simultaneously dispose the base front edge adjacent to the exterior edge of the water valve and the locking arm above a rotatable handle on the water valve;
    wherein the locking arm is configured to prevent the handle from rotating in a right direction and alternately in a left direction beyond the locking arm disposed atop the water valve;
    wherein the base, the pair of pin height adjustable legs, and the locking arm are metal.

* * * * *